US012299650B2

(12) United States Patent
Bergschneider et al.

(10) Patent No.: US 12,299,650 B2
(45) Date of Patent: May 13, 2025

(54) SERVICE DRIVEN PROCESSING IN FINANCIAL TRANSACTIONS

(71) Applicant: Diebold Nixdorf, Incorporated, North Canton, OH (US)

(72) Inventors: Wolfgang Bergschneider, Salzkotten (DE); Thorsten Brinkmann, Borchen (DE)

(73) Assignee: Diebold Nixdorf, Incorporated, North Canton, OH (US)

( * ) Notice: Subject to any disclaimer, the term of this patent is extended or adjusted under 35 U.S.C. 154(b) by 0 days.

(21) Appl. No.: 18/726,288

(22) PCT Filed: Jan. 25, 2023

(86) PCT No.: PCT/US2023/011514
§ 371 (c)(1),
(2) Date: Jul. 2, 2024

(87) PCT Pub. No.: WO2023/146891
PCT Pub. Date: Aug. 3, 2023

(65) Prior Publication Data
US 2024/0420101 A1    Dec. 19, 2024

Related U.S. Application Data

(60) Provisional application No. 63/303,199, filed on Jan. 26, 2022.

(51) Int. Cl.
*G06Q 20/10* (2012.01)
(52) U.S. Cl.
CPC .................. *G06Q 20/10* (2013.01)

(58) Field of Classification Search
CPC ...................................................... G06Q 20/10
(Continued)

(56) References Cited

U.S. PATENT DOCUMENTS 6,971,096 B1    11/2005  Ankireddipally
2008/0301049 A1  12/2008  Dyson
(Continued)

OTHER PUBLICATIONS

Written Opinion filed in corresponding PCT Application No. US/2023/011230 dated Apr. 4, 2023; 4 Pages.

(Continued)

*Primary Examiner* — Hani M Kazimi
(74) *Attorney, Agent, or Firm* — Black McCuskey

(57) ABSTRACT

A method of performing a financial transaction can include receiving, with a first computing device, a request to execute a financial transaction. The first or a second computing device can determine identities of the service applications required to complete the financial transaction. One of the first or second computing devices can then determine an order of executing each of the service applications. One of the first or second computing devices can direct respective second inputs to at least some of the service applications to thereby initiate respective operations of these service applications. Each of the service applications can then complete respective operations. One of the first or second computing device can receive respective outputs from the at least some of the service applications. The first computing device can then complete the financial transaction.

19 Claims, 6 Drawing Sheets

(58) Field of Classification Search
USPC .................................................. 705/39–42
See application file for complete search history.

(56) References Cited

U.S. PATENT DOCUMENTS

| | | |
|---|---|---|
| 2014/0207682 A1 | 7/2014 | Wolfond et al. |
| 2014/0222673 A1 | 8/2014 | Christophersen |
| 2015/0134953 A1 | 5/2015 | Seaborn et al. |
| 2015/0212920 A1* | 7/2015 | Kraus ................. G06F 11/3006 |
| | | 717/127 |
| 2017/0075798 A1* | 3/2017 | Lau ......................... G06F 11/30 |
| 2017/0199806 A1* | 7/2017 | Dahan ................. G06F 11/3636 |
| 2017/0200097 A1* | 7/2017 | Lau ..................... G06Q 10/0633 |

OTHER PUBLICATIONS

International Search Report filed in corresponding PCT Application No. US/2023/011230 dated Apr. 4, 2023; 2 Pages.
Rabhi, et al "A service-oriented architecture for financial business processes: A case study in trading strategy simulation." Information Systems and E-Business Management 5 (2006): 185-200. Retrieved on Apr. 1, 2023 from, https://link.springer.com/article/10.1007/s10257-006-0041-x>.
International Preliminary Report on Patentability filed in the corresponding PCT Application dated Jul. 30, 2024; 5 pages.

* cited by examiner

SERVICE DRIVEN PROCESSING IN FINANCIAL TRANSACTIONS

CROSS-REFERENCE TO RELATED APPLICATIONS

This application claims the benefit of United States Provisional Patent Application Ser. No. 63/303,199 for a SERVICE DRIVEN PROCESSING IN FINANCIAL TRANSACTIONS, filed on 26 Jan. 2022, which is hereby incorporated by reference in its entirety.

BACKGROUND

1. Field

The present disclosure relates to systems for processing financial transactions.

2. Description of Related Prior Art

U.S. Pub. No. 2015/0134953 discloses a METHOD AND APPARATUS FOR OFFERING CLOUD-BASED HSM SERVICES. A HSM service controller receives an administrative request to enable a cloud-based application to have access to a cloud-based HSM service. The HSM service controller segments a cloud-based HSM into a plurality of VHSMs. The HSM service controller allocates to the cloud-based application, a source VHSM from among the plurality of VHSMs. The source VHSM includes an initial set of credentials, roles and/or metadata. The HSM service controller stores a handle for the source VHSM in association with a handle for the cloud-based application. The HSM service controller routes cryptography requests between the cloud-based application and the VHSM based on the handle for the source VHSM and the handle for the cloud-based application. The HSM service controller receives one or more management requests from the cloud-based application and executes cloud administrator functions responsive to the management request.

U.S. Pub. No. 20080301049 discloses a Transaction Management System. The transaction management system includes a plurality of individually identifiable secure container holding facilities constituted by cash acceptance terminals located at the premises of participating merchants and a plurality of individually identifiable secure containers or cash containers, each adapted to dock with and un-dock from a cash acceptance terminal. The merchants, in each transaction, deposit transaction documents such as money, cheques, credit card vouchers or the like into the secure container within the cash acceptance terminal. Cash money fed into the cash acceptance terminal is scanned, validated and counted into the secure container. The cash acceptance terminals include data entry facilities by means of which data pertaining to transactions is recorded in the cash acceptance terminal. The secure containers and the cash acceptance terminals are adapted for bidirectional communication and the data recorded in the cash acceptance terminal is communicated to the secure container. The transaction management system includes a central server in communication with the data processing system of a number of financial institutions. The cash acceptance terminals are programmed to communicate with the server. Purchasers are able to use the cash acceptance terminals as banking facilities and, using a cash acceptance terminal with a facility to recirculate and to dispense cash, the system may be programmed to allow the cash acceptance terminals to dispense cash and credit value, thereby allowing a purchaser to use a cash acceptance terminal like an automated teller machine (ATM) to draw cash, to transfer money between accounts, for bill payment or the like. Using an appropriate tracking and scheduling system, the central server is programmed to record the identity and location of each cash acceptance terminal and every secure container in the system as well as the monetary value stored in or to be obtained from each cash acceptance terminal and secure container in the system which enables the system operator and participating financial institutions to manage the flow of cash within the system without necessarily routing each cash consignment through a cash processing centre or financial institution. The transaction management system is essentially a cash bank with a cash repository that is not constituted by a conventional vault, but by a virtual repository constituted by the secure cash acceptance terminals and secure containers that are all tracked and audited by the system.

U.S. Pub. No. 2022/0393863 discloses ENTANGLED LINKS, TRANSACTIONS AND TREES FOR DISTRIBUTED COMPUTING SYSTEMS. An entangled links mechanism establishes and maintains bipartite temporal intimacy between pairs of computers, using an idempotent, reversible token method which presents no observable external "change" until a communication of information needs to occur between the computers, and which maintains the potential for "bounded (or unbounded) reversibility" in case the intended information dispatched by a source computational entity is not captured or properly accepted by a destination computational entity. The mechanism enables distributed computers in a network to remain continuously aware of each other's presence; to communicate on a logically nearest neighbor basis in a secure and reliable manner in which packets passed over these links do not conflict with normal traffic or cause the available resources of the link to be exceeded; and that atomicity, consistency, isolation, and "reversible durability" may be maintained for transactions when perturbations occur.

FIG. 1 is a very generalized schematic of a system 10 for executing financial transactions according to the prior art. The system 10 includes connector services 12 for communicating with devices that input requests for financial transactions. Such input devices could include, by way of example and not limitation, automated transaction machines (ATMs), smartphones operating banking applications, point of sale devices, computing devices operated by bank tellers, and payroll companies. The connector services 12 includes a connector layer 14 and one or more application programming interfaces (APIs) 16. In the system 10, transaction requests are abstracted through a first abstraction layer 18 and processed by a processing services functionality 20. The processing services functionality 20 performs operations according to coding, which establishes actions to be performed according to a predetermined order. This service profile is schematically represented by the icon 22. Each kind of transaction that the system can process/execute is coded within the service profile. Processing often requires gaining approval from an authorization services functionality 24. At least a portion of a transaction request can be abstracted through a second abstraction layer 26 and processed by the authorization services functionality 24.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of performing a financial transaction can include receiving, with a first computing device having one or more processors, a request to execute a financial transaction. The request can include a plurality of first inputs. The method can also include determining, with at least one of the first computing device and a second computing device having one or more processors and distinct from the first computing device, identities of a plurality of service applications required to complete the financial transaction. The method can also include determining, with at least one of the first computing device and the second computing device, after the receiving, an order of executing each of the plurality of service applications. The method can also include directing, with at least one of the first computing device and the second computing device, respective second inputs to at least some of the plurality of service applications to thereby initiate respective operations of the at least some of the plurality of service applications. The method can also include completing, with each of the plurality of service applications, after the directing, the respective operations. The method can also include receiving, with at least one of the first computing device and the second computing device, after the completing, from at least some of the plurality of service applications, respective outputs from the at least some of the plurality of service applications. The method can also include completing, with the first computing device, after the receiving the respective outputs, the financial transaction.

According to other features, the at least one of the first computing device and the second computing device can be further defined as the first computing device. The first computing device can be further defined as an input device that is directly engaged by a human user that requested the financial transaction. The method can also include modifying, with the second computing device, the identities of the plurality of service applications required to complete the financial transaction after the completing.

In other features, the at least one of the first computing device and the second computing device is further defined as the second computing device. The first computing device can be further defined as an input device that is directly engaged by a human user that requested the financial transaction and the second computing device can be further defined as a server that is physically remote from the first computing device. The method can also include receiving, with the second computing device from the first computing device, the request to execute the financial transaction and at least some of the plurality of first inputs and can also include communicating, after the completing, with the second computing device, to the first computing device, a command to complete the financial transaction.

According to additional features, the method can further comprise modifying, with the second computing device, the identities of the plurality of service applications required to complete the financial transaction after the completing. The method can further comprise modifying, with the second computing device, an operation of at least one of the plurality of service applications after the completing. The step of determining the identities can be further defined as determining, with at least one of the first computing device and a second computing device having one or more processors and distinct from the first computing device, after the receiving, identities of a plurality of service applications required to complete the financial transaction.

According to other features, the step of determining the order can further comprise assessing, with the at least one of the first computing device and the second computing device, a current capacity of all of the plurality of service applications. The step of the directing can further comprise controlling, with the at least one of the first computing device and the second computing device, at least two of the at least some of the plurality of service applications having current capacity to operate concurrently. The step of directing can further comprise controlling, with the at least one of the first computing device and the second computing device, at least two of the at least some of the plurality of service applications to operate concurrently.

In other features, the receiving step can be further defined as receiving, with the first computing device having the one or more processors, the request to execute the financial transaction, the request including the plurality of first inputs including at least two of a name of a human user that requested the financial transaction, an account against which the financial transaction is recorded, a personal identification number, and a nature of the financial transaction. The step of determining identities can be further defined as determining, with the first computing device, the identities of the plurality of service applications required to complete the financial transaction and the step of determining order can be further defined as determining, with the second computing device, after the receiving, the order of executing each of the plurality of service applications.

According to additional features, the step of directing can be further defined as directing, with at least one of the first computing device and the second computing device, at least some of the first inputs as respective second inputs to at least some of the plurality of service applications to thereby initiate respective operations of the at least some of the plurality of service applications. The directing step can be further defined as directing, with at least one of the first computing device and the second computing device, an output of a first service application of the at least some of the plurality of service applications as a second input of a second service application of the at least some of the plurality of service applications.

According to other features, the step of directing can be further defined as directing, with at least one of the first computing device and the second computing device, respective second inputs to less than all of the plurality of service applications to thereby initiate respective operations of the less than all of the plurality of service applications. The method can further comprises storing, in a database, each of the plurality of service applications as a JavaScript Object Notation object.

BRIEF DESCRIPTION OF THE DRAWINGS

The detailed description set forth below references the following drawings.

DETAILED DESCRIPTION

Figure 1:
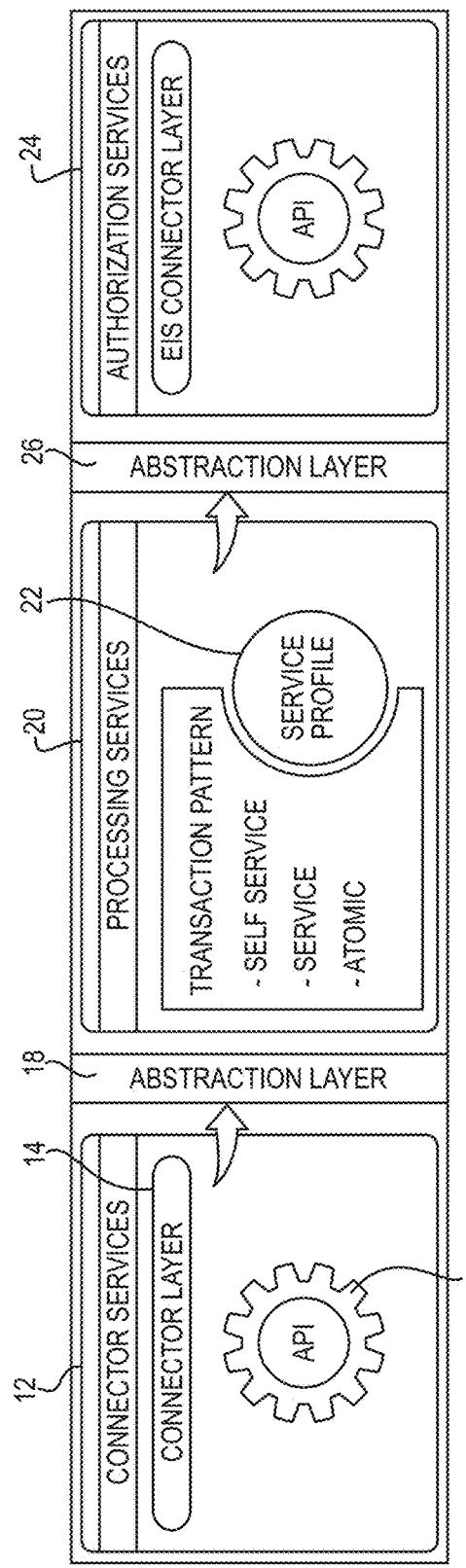
FIG. 1 is a first schematic of a system for executing financial transactions according to the prior art.
Figure 2:
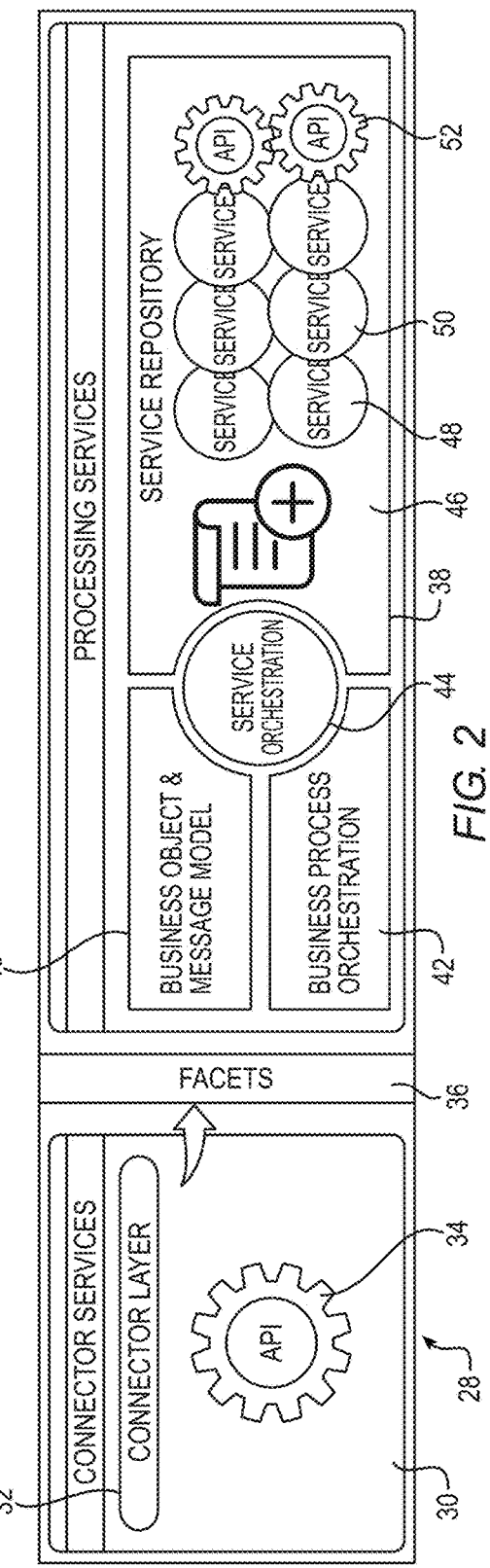
FIG. 2 is a second schematic of a system for executing financial transactions according to the present disclosure.

The present disclosure, as demonstrated by the exemplary embodiments described below, provides a system for executing financial transactions that is driven by the performance of discrete services that are called in real time, in contrast to the execution of financial transactions through coding that establishes particular tasks performed in a predetermined order. FIG. 2 is a very generalized schematic of a system 28 for executing financial transactions according to the present disclosure. The system 28 includes connector services 30 for communicating with devices that input requests for financial transactions. Such input devices could include, by way of example and not limitation, ATMs, smartphones operating banking applications, point of sale devices, computing devices operated by bank tellers, and payroll companies. The connector services 30 includes a connector layer 32 and one or more APIs 34. In the system 28, one or more Facets, represented generally at 36, are applied to transaction requests. Facets provide support for a variety of different frameworks, technologies and languages. A Facet facilitates the downloading and configuring of any necessary libraries to accommodate different formats of financial transactions.

Financial transactions are then directed to a processing services functionality 38. The processing services functionality 38 is configured to determine a business object and message model of a received, requested financial transaction, as schematically represented as a module at 40. This determination involves identifying the nature of the financial transaction being requested. The nature of the financial transaction corresponds to a "business model" and the processing services functionality 38 is configured to execute a plurality of business models. Determining the "message model" corresponds to the format of message to communicate back to the device that input the requested financial transaction.

In the present disclosure, the processing services functionality 38 is configured to orchestrate completion of process associated with the business object, as schematically represented at 42. In other words, the processing services functionality 38 is configured to manage completion of the business model and thus manage completion of the requested financial transaction. Completion of the business model (requested financial transaction) is a "business process" in the present disclosure.

In the present disclosure, the completion of business model (performance of the business model) can require the performance of a plurality of discrete services. Each service can be performed by a service application. The service applications can be JavaScript Object Notation (JSON) objects. The processing services functionality 38 can also include a service orchestration module 44 to control the activity of service applications called to perform services for completion of the requested financial transaction. The processing services functionality 38 can also include a service repository 46, such as database, containing all of the service applications necessary for completing all of the kinds of financial transactions that can be performed by the system 28. Service applications are graphically referenced, for example, at 48 and 50. The service repository 46 can also hold APIs, such as referenced by example at 52. The business process orchestrator module 42 can direct the service orchestration module 44 to make the calls to the needed service applications and APIs.

It is noted that, in the prior art system shown in FIG. 2, the flow of the completion of any permitted transaction is predetermined in terms of the actions required and the order of actions. Further, the flow is establish in coding at the device that receives the input requesting the transaction. In contrast, in a system according to the present disclosure, the flow of services can be defined during run time, in real time. Further, in a system according to the present disclosure, the identities of the service applications to be called can be changed by changing the modeling of the business process and thereby avoid the requirement of altering code at the device that receives the input requesting the transaction. Further, a system according to the present disclosure more easily allows for the introduction of new kinds of transactions that can be processed.

Figure 3:
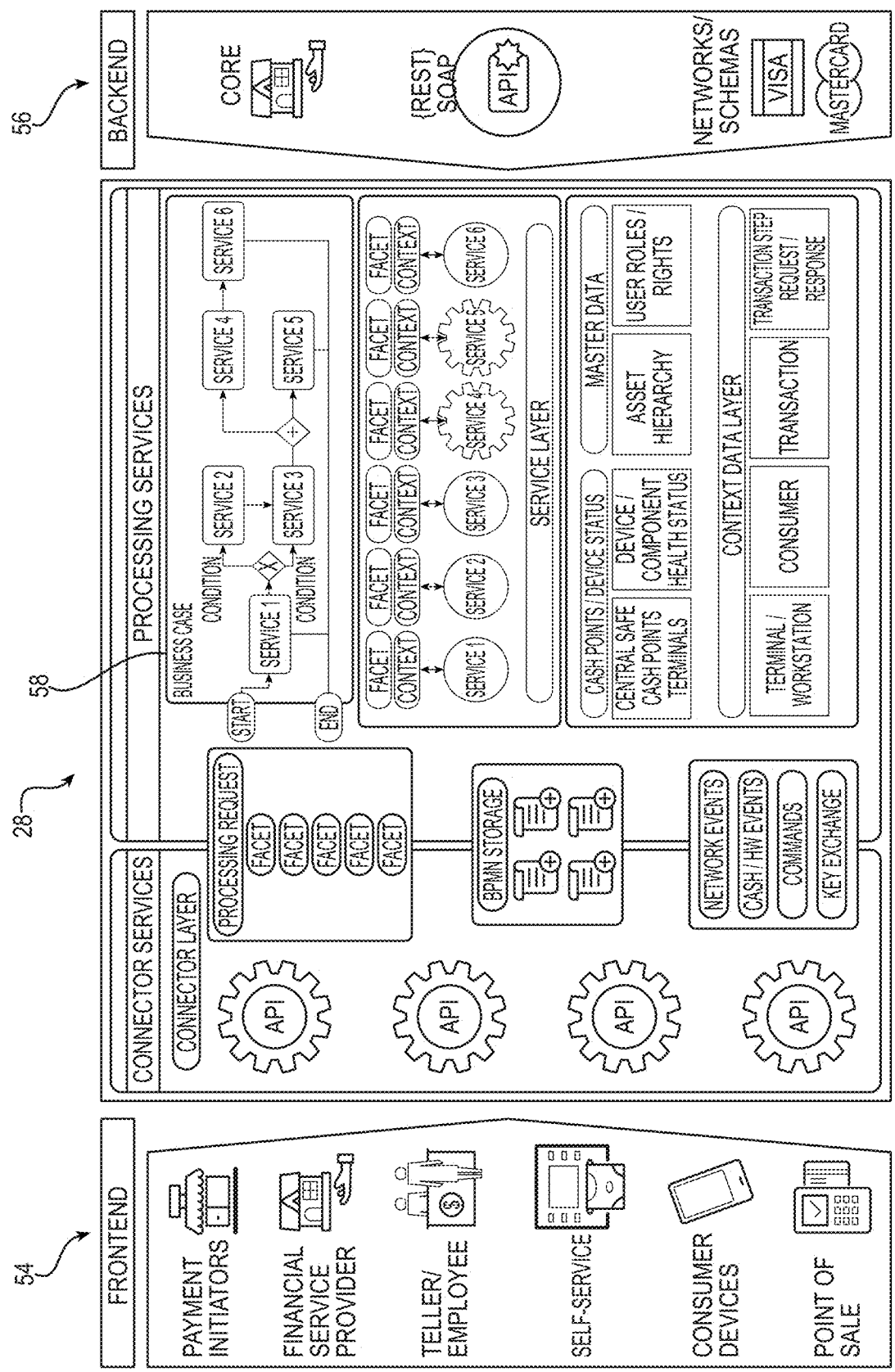
FIG. 3 is a third schematic of the system for executing financial transactions according to the present disclosure, more detailed than the second schematic shown in FIG. 2.

FIG. 3 is a schematic of the system 28 that is more detailed than the second schematic shown in FIG. 2. As referenced at 54, FIG. 3 shows the various kinds of devices that can receive an input requesting a transaction. As referenced at 56, FIG. 3 shows the various kinds of back end systems and devices for granting approval of transactions and recording or ledgering such transactions. As referenced at 58, FIG. 3 shows a simplified flow diagram of identities and order of service applications called and executed to complete a particular, requested financial transaction (or "business case").

Figure 4:
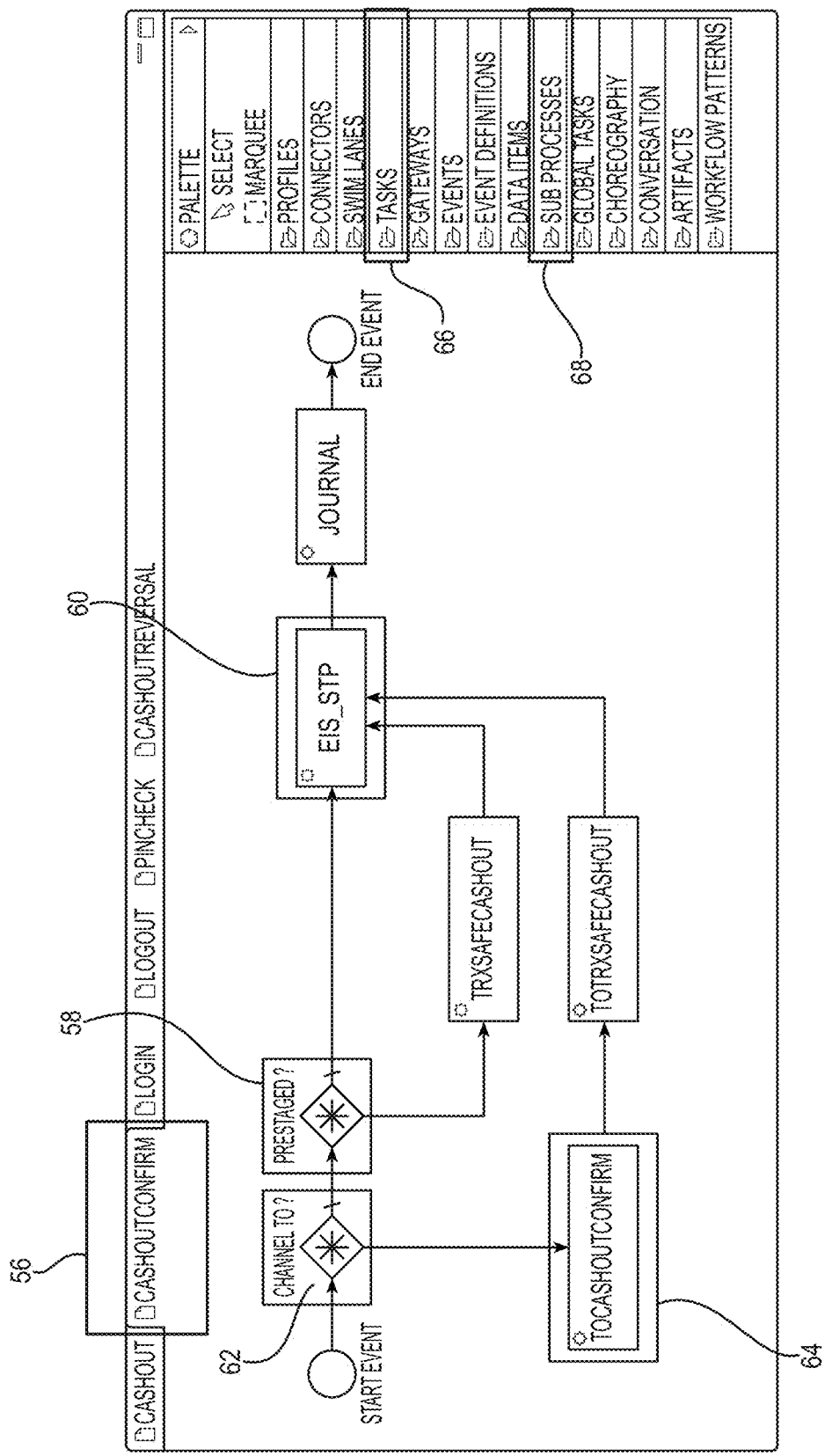
FIG. 4 is a first screen capture of a software application in operation wherein the software application is utilized for selecting service applications to be called for the execution of a financial transaction.
Figure 5:
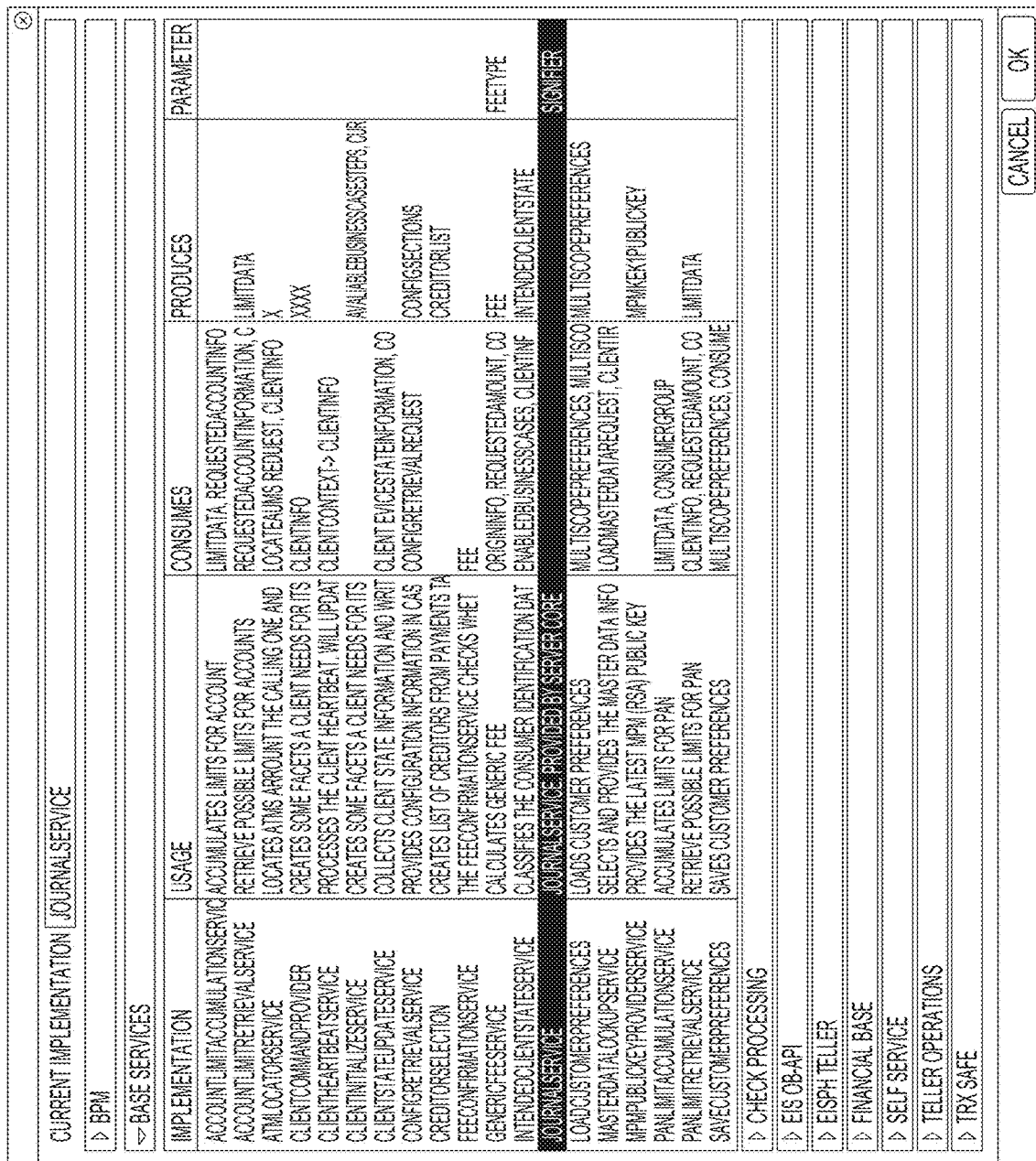
FIG. 5 is a second screen capture of the software application also shown in FIG. 4 in operation.
Figure 5:
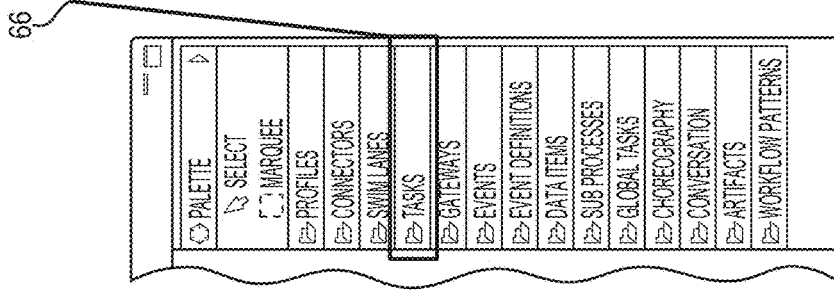

FIGS. 4 and 5 are screen captures of a software application in operation wherein the software application is utilized for selecting and creating service applications to be called for the execution of a financial transaction. An example of such a software application is a Business Process Model and Notation (BPMN) designer tool. The BPMN tool can be used to create and modify business models and as well as service applications that are utilized in business models. Referring now to FIG. 4, a tab 56 corresponds to a service application. The row of tabs corresponds to a business model. The exemplary business model represented by the row of tabs is a cash withdrawal. Each of the tabs is performed to complete the cash withdrawal business model. Some of the sub-steps performed during execution of the service application 56 are referenced at 58, 60, 62, and 64.

FIG. 4 also shows various resources provided by the BPMN tool to alter the service application 56. Items referenced at 66 and 68 are pull down menus that provide the user with options to alter the service application 56. FIG. 5 shows, in the exemplary embodiment, options that become accessible when the user selects the pull down menu 66.

Figure 6:
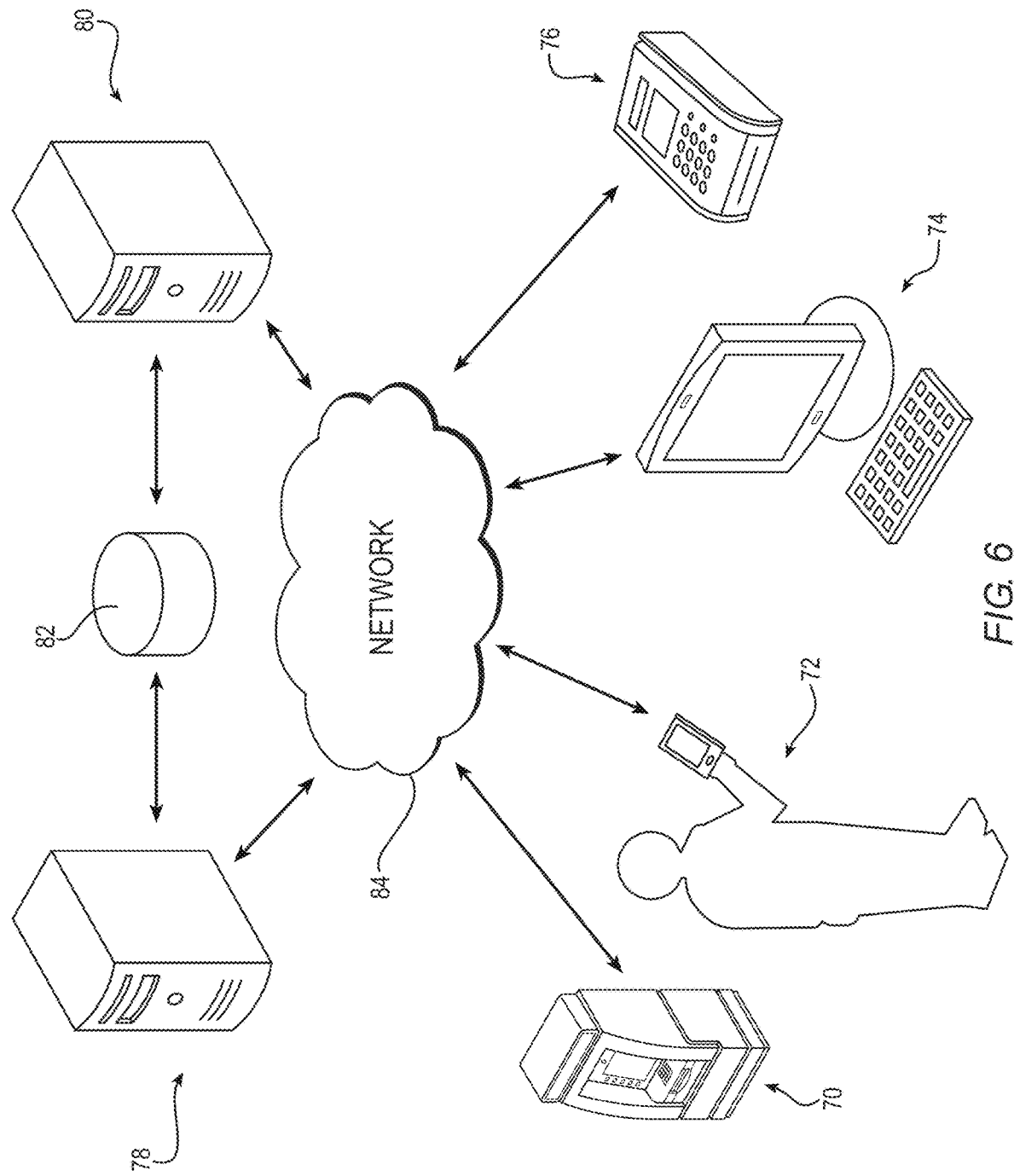
FIG. 6 is a fourth schematic of an operating environment for an embodiment of the present disclosure.

FIG. 6 is a fourth schematic of an operating environment for an embodiment of the present disclosure. The system 28 can operate in the environment shown in FIG. 6. FIG. 6 shows several alternative embodiments of a first computing device that can have one or more processors and can receive a request to execute a financial transaction. A first exemplary computing device 70 is an ATM. A second exemplary computing device 72 is a smartphone operating an application (an app) controlled in part by a bank. A third exemplary computing device 74 is a computer operated by a teller in a bank. A fourth exemplary computing device 76 is a point of sale device. Each of these devices 70, 72, 74, 76 can receive the request and the data received as part of the request can including a plurality of first inputs. Examples of possible first inputs include, but are not limited to, a name of a human user that requested the financial transaction; an account against which the financial transaction will be assessed and recorded; a personal identification number (PIN); an indication of the nature of the transaction that is being requested such as, by way of example and not limitation, cash withdrawal or cash deposit or check deposit or balance inquiry.

The operating environment can also include second computing devices 78 and 80. All of computing devices identified herein has one or more processors and a computer readable medium (memory) for storing instructions and data. It should be appreciated that the term "processor" as used herein can refer to both a single processor and two or more processors operating in a parallel or distributed architecture. The processors applied in the computing devices 70, 72, 74, 76, 78, 80 can respectively operate under the control of an operating system, kernel and/or firmware and can execute or otherwise rely upon various computer software applications, components, programs, objects, modules, data structures, etc. The processors can each be configured to perform general functions including, but not limited to, loading/executing an operating system of the respective computing devices 70, 72, 74, 76, 78, 80 controlling communications, and controlling read/write operations to the respective memory.

Each memory of the respective computing devices 70, 72, 74, 76, 78, 80 can be defined in various ways in implementations of the present disclosure. Each memory can include computer readable storage media and communication media. Each memory can be non-transitory in nature, and may include volatile and non-volatile, and removable and non-removable media implemented in any method or technology for storage of information, such as computer-readable instructions, data structures, program modules or other data. Each memory can further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the respective processor. Each memory can store computer readable instructions, data structures or other program modules.

The exemplary second computing devices 78, 80 are server computing devices, physically remote from the first computing devices 70, 72, 74, 76. The operating environment can also include a database 82. The exemplary second computing devices 78, 80 are configured to access the database 82.

In the exemplary operating environment, the second computing devices 78, 80 can each directly access the database 14 and communicate with the first computing devices 70, 72, 74, 76 over a network 84. The network 84 can include a local area network (LAN), a wide area network (WAN), e.g., the Internet, a virtual private network (VPN), or a combination thereof. The present disclosure is well suited to a wide variety of computer network systems over numerous topologies. The exemplary second computing devices 78, 80 can communicate with one another directly or over the network 84.

Figure 7:
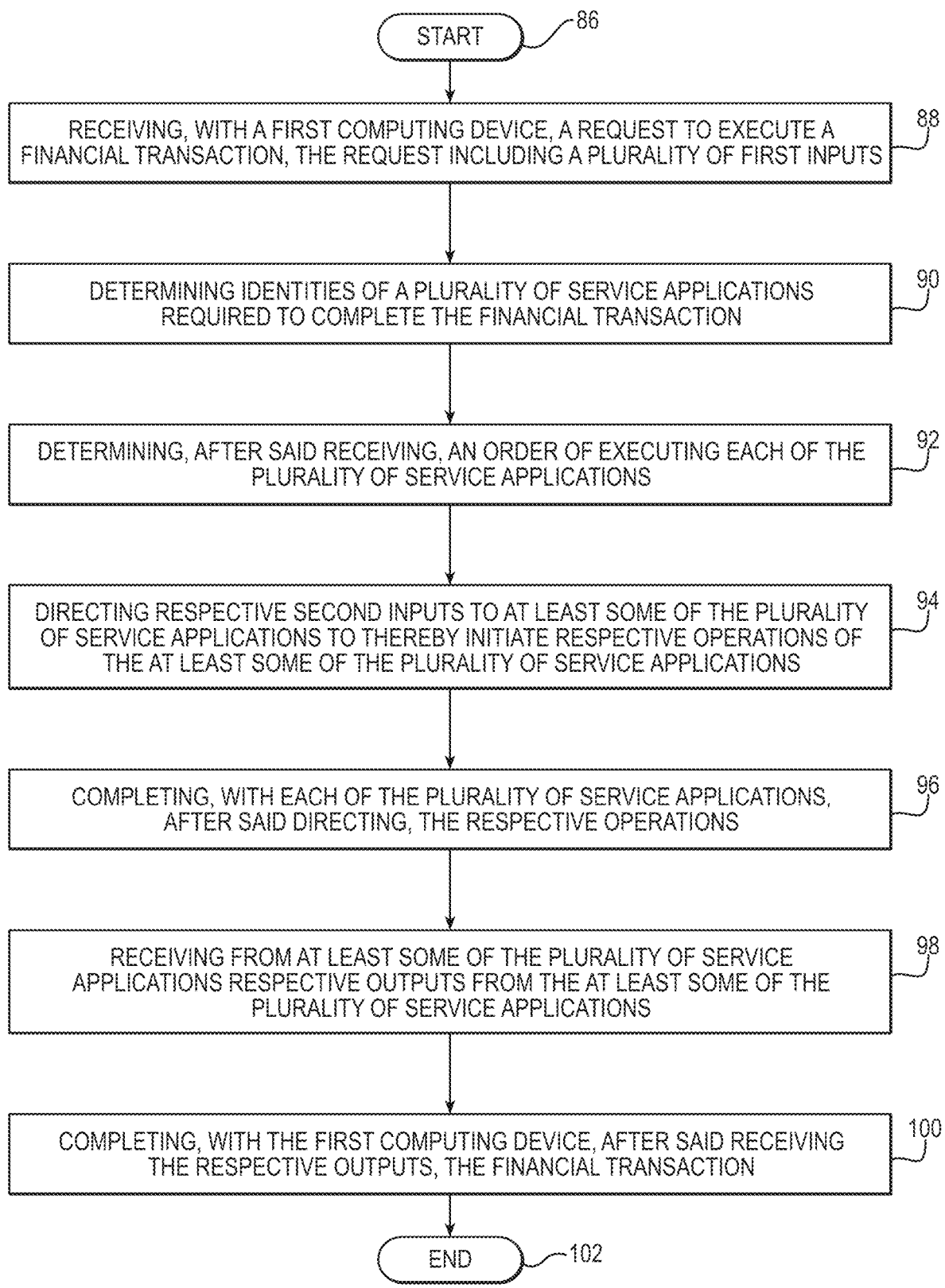
FIG. 7 is a simplified flow diagram of the operation of an embodiment of the present disclosure.

FIG. 7 is a simplified flow diagram of the operation of an embodiment of the present disclosure. The method starts at step 86. At 88, one of the first computing devices 70, 72, 74, 76 receives a request to execute a financial transaction that includes a plurality of first inputs. In various embodiments of the present disclosure, portions of the system 28 (referenced in FIGS. 2 and 3) may be operating on the first computing devices 70, 72, 74, 76 that has received the request to execute the financial transaction. For example, the first computing devices 70, 72, 74, 76 that has received the request to execute the financial transaction may define the front end 54 as well as the connector services 30. In alternative embodiments, the first computing devices 70, 72, 74, 76 that has received the request to execute the financial transaction may define only the front end 54. In such embodiments, the first computing devices 70, 72, 74, 76 can transmit the request to one of the second computing devices 78 or 80, which would hold the connector services 30. In both alternatives, the connector services 30 can process the request as necessary to ensure that subsequent operations, as set forth below, can be performed.

At 90, after any relevant Facets have been applied, the module 40 of the system 28 can determine the nature of the transaction being requested and, further, the identities of a plurality of service applications required to complete the requested financial transaction. For example, the service applications 48 or 50 may be required. The module 40 may be operating on one of the first computing devices 70, 72, 74, 76 or one of the second computing devices 78, 80.

It is noted that in various embodiments of the present disclosure, the module 40 for determining identities may be operating on one of the first computing devices 70, 72, 74, 76 and may store in associated memory a correlating table that identifies the service applications to be utilized for each kind of financial transaction that can be completed. Further, one of the second computing devices 78, 80 can be configured to modify the table and thus the identities of the service applications required to complete various financial transactions. For example, an administrator of the system 28 can modify the identities at one of the second computing devices 78, 80 and such modifications can be communicated to and implemented on the first computing devices 70, 72, 74, 76 where the module 40 is operating. Such changes can occur on regular schedule or as-needed. A particular transaction may be completed using a first set of service applications a various number of times and then completed using a second set of service applications as the administrator deems appropriate.

In one or more embodiments, the identities may be found stored in memory associated with the exemplary module 40 and thus be predetermined. Alternatively, the identities may be determined anew, after the request for the financial transaction is received. For example, a module 40 operating on one of the first computing devices 70, 72, 74, 76 can be configured to query one of the second computing devices 78, 80 during each transaction.

At 92, the module 42 of the system 28 can determine, after the receiving at 88, an order of executing each of the plurality of service applications determined at 90. The module 42 may be operating on one of the first computing devices 70, 72, 74, 76 or one of the second computing devices 78, 80. In various embodiments, the module 40 for determining at 90 may be operating on one of the first computing devices 70, 72, 74, 76 and the module 42 for determining at 92 may be operating on one of the second computing devices 78, 80. The determining at 92 is after the receiving 88; in other words, the determining at 92 is not predetermined but made in real time (or at run time).

The module 42, in determining the order, can assess what service application(s) must be done first based on logic considerations. For example, one of the service applications may require as input the output of another service application. In addition, the module 42 is configured to assess if multiple service applications can be executed concurrently. The flow diagram 58 in FIG. 3 shows services 1 and 2 (service applications 1 and 2) be operated concurrently. In addition, the module 42 is configured to assess a current capacity/availability of all of the plurality of service applications and thus identify which service applications can be started immediately. The module 42 can be configured to determine the order to maximize the efficiency of system resources and to minimize the time required to complete the transaction.

At 94, the module 44 can implement the order determined by module 42 and direct respective second inputs to at least some of the plurality of service applications to thereby initiate respective operations of the at least some of the plurality of service applications. The module 44 may be operating on one of the first computing devices 70, 72, 74, 76 or one of the second computing devices 78, 80. One or more of the second inputs directed to various service applications may be one of the first inputs received during the receiving 88 or may be outputs from one of the other service applications. Not all of the service applications to be engaged may require a data input, in contrast to merely a call or command to engage. The services applications can be stored in the service repository, which can be the database 82.

The directing 94 by the module 44 can include controlling at least two of the service applications having current capacity to operate concurrently. An example of this is shown in the flow diagram 58 in FIG. 3, specifically exemplary service applications references by services 2 and 3 and by services 4 and 5. The directing 94 by the module 44 can be further defined as directing at least some of the first inputs as respective second inputs to at least some of the plurality of service applications to thereby initiate respective operations of those service applications. The directing 94 by the module 44 can be further defined as directing an output of a first service application as a second input to a second service application. The directing 94 by the module 44 can be further defined as directing respective second inputs to less than all of the plurality of service applications to thereby initiate respective operations of the less than all of the plurality of service applications; this allows the system 28 to utilize service applications based on the current capacity of each of the service applications.

At 96, each of the service applications complete respective operations. At 98, respective outputs from the at least some of the plurality of service applications are received by the module 44 or the module 42. If the outputs are initially received by the module 44, the module 44 can then transmit the outputs to the module 42. Receipt of the outputs at 98 corresponds to the completion of processing operations for completing the requested financial transaction. Receiving 98 may begin before all of the service applications have completed their respective operations and can be complete when all of the service applications have completed their respective operations. All of the service applications may not communicate an output to the system 28, such as, for example, a ledgering service application may communicate output to a banking core.

At 100, the first computing device 70, 72, 74 or 76 completes the financial transaction after said receiving the respective outputs. In embodiments in which the connector services 30 and modules 40, 42, and 44 are operating on the first computing device, the outputs of the service applications will be received directly by the first computing device and the first computing device can then complete the financial transaction. Completing a transaction can involve, by way of example and not limitation, dispensing currency, printing a receipt for a currency or check deposit, or returning unacceptable currency or a check. In embodiments in which the connector services 30 and modules 40, 42, and 44 are operating on the second computing device, the outputs of the service applications will be received directly by the second computing device, the second computing device can communicate to the first computing device a command to complete the financial transaction, and the first computing device can then complete the financial transaction. The process ends at 102.

The use of any and all examples, or exemplary language (e.g., "such as") provided herein is intended merely to be illustrative and does not pose a limitation on the scope of any invention disclosed herein unless otherwise claimed. As used herein, the singular forms "a," "an," and "the" include plural referents unless the context clearly dictates otherwise. Unless indicated otherwise by context, the term "or" is to be understood as an inclusive "or." Terms such as "first", "second", "third", etc. when used to describe multiple devices or elements, are so used only to convey the relative actions, positioning and/or functions of the separate devices, and do not necessitate either a specific order for such devices or elements, or any specific quantity or ranking of such devices or elements. Use of the terms "about" or "approximately" are intended to describe values above and/or below a stated value or range, as would be understood by one having ordinary skill in the art in the respective context. In some instances, this may encompass values in a range of approx. +/−10%; in other instances there may be encompassed values in a range of approx. +/−5%; in yet other instances values in a range of approx. +/−2% may be encompassed; and in yet further instances, this may encompass values in a range of approx. +/−1%.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless indicated herein or otherwise clearly contradicted by context. Recitations of a value range herein, unless indicated otherwise, serves as a shorthand for referring individually to each separate value falling within the stated range, including the endpoints of the range, each separate value within the range, and all intermediate ranges subsumed by the overall range, with each incorporated into the specification as if individually recited herein. Unless indicated otherwise, or clearly contradicted by context, methods described herein can be performed with the individual steps executed in any suitable order, including: the precise order disclosed, without any intermediate steps or with one or more further steps interposed between the disclosed steps; with the disclosed steps performed in an order other than the exact order disclosed; with one or more steps performed simultaneously; and with one or more disclosed steps omitted.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to a particular embodiment disclosed herein as the best mode contemplated for carrying out this present disclosure, but that the present disclosure will be viewed as covering any embodiment falling within the scope of the appended claims. Also, the right to claim a particular sub-feature, sub-component, or sub-element of any disclosed embodiment, singularly or in one or more sub-combinations with any other sub-feature(s), sub-component(s), or sub-element(s), is hereby unconditionally reserved by the Applicant. Also, particular sub-feature(s), sub-component(s), and sub-element(s) of one embodiment that is disclosed herein can replace particular sub-features, sub-components, and sub-elements in another embodiment disclosed herein or can supplement and be added to other embodiments unless otherwise indicated by the drawings or this specification. Further, the use of the word "can" in this document is not an assertion that the subject preceding the word is unimportant or unnecessary or "not critical" relative to anything else in this document. The word "can" is used herein in a positive and affirming sense and no other motive should be presumed. More than one "invention" may be disclosed in the present disclosure; an "invention" is defined by the content of a patent claim and not by the content of a detailed description of an embodiment of an invention.

What is claimed is:

1. A method of performing a financial transaction comprising:
   receiving, with a first computing device having one or more processors, a request to execute a financial transaction, the request including a plurality of first inputs;
   determining, with at least one of the first computing device and a second computing device having one or more processors and distinct from the first computing device, identities of a plurality of service applications required to complete the financial transaction;
   determining, with at least one of the first computing device and the second computing device, after said receiving, an order of executing each of the plurality of service applications;
   directing, with at least one of the first computing device and the second computing device, respective second inputs to at least some of the plurality of service applications to thereby initiate respective operations of the at least some of the plurality of service applications;
   completing, with each of the plurality of service applications, after said directing, the respective operations;
   receiving, with at least one of the first computing device and the second computing device, after said completing, from at least some of the plurality of service applications, respective outputs from the at least some of the plurality of service applications;
   completing, with the first computing device, after said receiving the respective outputs, the financial transaction.

2. The method of claim 1 wherein the at least one of the first computing device and the second computing device is further defined as the first computing device.

3. The method of claim 2 wherein the first computing device is further defined as an input device that is directly engaged by a human user that requested the financial transaction.

4. The method of claim 3 further comprising:
   modifying, with the second computing device, the identities of the plurality of service applications required to complete the financial transaction after said completing.

5. The method of claim 1 wherein the at least one of the first computing device and the second computing device is further defined as the second computing device.

6. The method of claim 5 the first computing device is further defined as an input device that is directly engaged by a human user that requested the financial transaction and the second computing device is further defined as a server that is physically remote from the first computing device.

7. The method of claim 5 further comprising:
   receiving, with the second computing device from the first computing device, the request to execute the financial transaction and at least some of the plurality of first inputs; and
   communicating, after said completing, with the second computing device, to the first computing device, a command to complete the financial transaction.

8. The method of claim 1 further comprising:
   modifying, with the second computing device, the identities of the plurality of service applications required to complete the financial transaction after said completing.

9. The method of claim 1 further comprising:
   modifying, with the second computing device, an operation of at least one of the plurality of service applications after said completing.

10. The method of claim 1 wherein said determining identities is further defined as:
    determining, with at least one of the first computing device and a second computing device having one or more processors and distinct from the first computing device, after said receiving, identities of a plurality of service applications required to complete the financial transaction.

11. The method of claim 1 wherein said determining order further comprises:
    assessing, with the at least one of the first computing device and the second computing device, a current capacity of all of the plurality of service applications.

12. The method of claim 11 wherein said directing further comprises:
    controlling, with the at least one of the first computing device and the second computing device, at least two of the at least some of the plurality of service applications having current capacity to operate concurrently.

13. The method of claim 1 wherein said directing further comprises:
    controlling, with the at least one of the first computing device and the second computing device, at least two of the at least some of the plurality of service applications to operate concurrently.

14. The method of claim 1 wherein said receiving is further defined as:
    receiving, with the first computing device having the one or more processors, the request to execute the financial transaction, the request including the plurality of first inputs including at least two of a name of a human user that requested the financial transaction, an account against which the financial transaction is recorded, a personal identification number, and a nature of the financial transaction.

15. The method of claim 1 wherein:
said determining identities is further defined as determining, with the first computing device, the identities of the plurality of service applications required to complete the financial transaction; and
said determining order is further defined as determining, with the second computing device, after said receiving, the order of executing each of the plurality of service applications.

16. The method of claim 1 wherein said directing is further defined as:
directing, with at least one of the first computing device and the second computing device, at least some of the first inputs as respective second inputs to at least some of the plurality of service applications to thereby initiate respective operations of the at least some of the plurality of service applications.

17. The method of claim 1 wherein said directing is further defined as:
directing, with at least one of the first computing device and the second computing device, an output of a first service application of the at least some of the plurality of service applications as a second input of a second service application of the at least some of the plurality of service applications.

18. The method of claim 1 wherein said directing is further defined as:
directing, with at least one of the first computing device and the second computing device, respective second inputs to less than all of the plurality of service applications to thereby initiate respective operations of the less than all of the plurality of service applications.

19. The method of claim 1 further comprising:
storing, in a database, each of the plurality of service applications as a JavaScript Object Notation object.

* * * * *